United States Patent
Menzel

(10) Patent No.: US 10,583,480 B2
(45) Date of Patent: Mar. 10, 2020

(54) CERAMIC AND/OR METAL POWDER PRESS HAVING A FILLING SHOE AND FILLING LINES AND METHOD FOR PRESSING A PRESSED BODY IN SUCH A PRESS

(71) Applicant: DORST Technologies GmbH & Co. KG, Kochel am See (DE)

(72) Inventor: Roland Menzel, Kochel am See (DE)

(73) Assignee: DORST Technologies GmbH & Co., KG, Kochel am See (DE)

( * ) Notice: Subject to any disclaimer, the term of this patent is extended or adjusted under 35 U.S.C. 154(b) by 1341 days.

(21) Appl. No.: 14/357,384

(22) PCT Filed: Nov. 9, 2012

(86) PCT No.: PCT/DE2012/001082
§ 371 (c)(1),
(2) Date: Nov. 25, 2014

(87) PCT Pub. No.: WO2013/067994
PCT Pub. Date: May 16, 2013

(65) Prior Publication Data
US 2015/0118339 A1    Apr. 30, 2015

(30) Foreign Application Priority Data
Nov. 12, 2011   (DE) .................. 10 2011 118 209

(51) Int. Cl.
*B29C 43/02*   (2006.01)
*B22F 3/00*   (2006.01)
(Continued)

(52) U.S. Cl.
CPC ............... *B22F 3/004* (2013.01); *B22F 3/03* (2013.01); *B28B 3/02* (2013.01); *B28B 13/023* (2013.01);
(Continued)

(58) Field of Classification Search
CPC ... B22F 3/004; B22F 3/03; B28B 3/02; B28B 13/023
(Continued)

(56) References Cited

U.S. PATENT DOCUMENTS 3,605,825 A   9/1971   Hermes
5,213,816 A * 5/1993   Smyth, Jr. ............. B29C 43/006
                                                  425/219

(Continued)

FOREIGN PATENT DOCUMENTS

DE    199 03 417       8/2000
EP    1 000 735 A2     5/2000
(Continued)

OTHER PUBLICATIONS

International Preliminary Report on Patentability for International Application No. PCT/DE2012/001082 dated May 13, 2014.
(Continued)

*Primary Examiner* — Joseph S Del Sole
*Assistant Examiner* — Thu Khanh T Nguyen
(74) *Attorney, Agent, or Firm* — Knobbe Martens Olson & Bear LLP

(57) ABSTRACT

The invention relates to a ceramic and/or metal powder press, comprising a die (1) with a die surface (1o) and a die opening (2) for filling in and compressing a material, a fill shoe (3) arranged to be moveable along a travel path (4) across the die surface (1o) for filling the material (p), and feed tubes (7, 8) connected with the fill shoe (3) for filling the material into or via the fill shoe (3), wherein at least two such feed tubes (7, 8) are connected to the fill shoe (3) from a direction lateral to the travel path. The invention also relates to a method for compressing a compact (12) of a metallic and/or ceramic powder and/or granular material (p) in such a ceramic and/or metal powder press.

14 Claims, 1 Drawing Sheet

(51) Int. Cl.
*B30B 15/30* (2006.01)
*B28B 13/02* (2006.01)
*B22F 3/03* (2006.01)
*C04B 35/626* (2006.01)
*B28B 3/02* (2006.01)

(52) U.S. Cl.
CPC ...... *B30B 15/304* (2013.01); *C04B 35/62695* (2013.01); *C04B 2235/604* (2013.01)

(58) Field of Classification Search
USPC ....................................... 425/260, 448, 449
See application file for complete search history.

(56) References Cited

U.S. PATENT DOCUMENTS 5,885,625 A * 3/1999 Beane .................. B29C 31/066
 425/448
6,117,374 A * 9/2000 Kaneko ................ B29C 31/066
 264/40.1
6,241,935 B1 * 6/2001 Beane .................. B29C 31/041
 264/109

FOREIGN PATENT DOCUMENTS

| JP | 62 109606 | 5/1987 |
| JP | H06-033105 | 2/1994 |
| JP | 6 210496 | 8/1994 |
| JP | 2002 301595 | 10/2002 |
| JP | 2004291070 | 10/2004 |
| JP | 2009-233681 | 10/2009 |

OTHER PUBLICATIONS

Office Action in Korean Application No. 10-2014-7016035 dated Nov. 14, 2018.

* cited by examiner

CERAMIC AND/OR METAL POWDER PRESS HAVING A FILLING SHOE AND FILLING LINES AND METHOD FOR PRESSING A PRESSED BODY IN SUCH A PRESS

CROSS-REFERENCE TO RELATED APPLICATIONS

This application is a U.S. National Phase under 35 U.S.C. § 371 of International Application No. PCT/DE2012/001082, filed Nov. 9, 2012, which claims priority to German Application Number 10 2011 118 209.1, filed Nov. 12, 2011 in the German Patent Office.

BACKGROUND

Technological Field

The invention relates to a ceramic and/or metal powder press, comprising a die having a die opening for filling in and compressing a metallic and/or ceramic powder and/or granular material, and a fill shoe for filling the material into the die opening of the die. The invention also relates to a method for compressing a compact by means of such a press, in particular.

Description of the Related Technology

Such presses and methods are generally known, for example, from EP 1 000 735 A2. In this type of arrangement, a so-called fill shoe is moveable across a die surface of the die in a longitudinal direction. The movement is effected by components of a guiding device, such as a drive apparatus, which is coupled with the fill shoe by means of a rod assembly, in order to enable a reciprocating movement of the fill shoe along the travel path across the die surface. Herein, the fill shoe is moved forward from a first rest and reversal position until it is above the die opening, to fill powder into the die opening. The powder is usually conveyed from a reservoir, in particular a powder hopper, via feed tubes into the fill shoe, and from the latter, or via the latter, into the die opening. The feed tubes open out into a fill shoe interior, which is optionally formed to be large enough to receive an entire filling as required for compressing a compact in a subsequent processing step. During or after filling, the fill shoe is traversed a short distance beyond the die opening, if required, before it is moved from said second rest and/or reversal position back to the first rest and reversal position. Thereafter, punches of a top punch assembly are lowered to compress the powder filled into the die opening by means of punches of a bottom punch assembly and punches of the top punch assembly to produce a compact. Subsequently, the punches of the top punch assembly are retracted to a position at a sufficient height above the die surface to leave enough headroom for removing the compact and for the subsequent movement of the fill shoe until it is above the die opening.

A duration of a compression cycle extends, for example, from when the fill shoe first starts moving forward from its first rest and reversal position to when it starts its next movement from this position. Because the components of such a press assembly used for compressing are expensive and carry out the essential processing step, i.e. compressing the compact from the material to be compressed, the cycle duration, among other things, is regarded as a loss of time, during which the punches of the top punch assembly are not active, in particular, are not in contact with any powder.

A drawback of such an arrangement is, in particular, that for building up sufficient feeding pressure within the one or the plurality of feed tubes, the feed tubes should rise up at the steepest possible angle. To achieve this, however, it is necessary that, in the filling position with the fill shoe above the die opening, the feed tubes extend to a great height thus requiring a lot of space above the structure. This is why the top punch assembly must be traversed to a great height. To enable the smoothest possible movement, the feed tubes are passed to the fill shoe from behind and are pulled along in the forward direction with the fill shoe as it is moved forward across the die opening. Further time is lost by having to traverse the fill shoe without filling material from its second reversal position back to the first rest and reversal position.

Such a fill device is also generally known from DE 199 03 417 B4. In this arrangement, a fill shoe is moved forward from its first rest and reversal position across the die opening and then swung back and forth in the lateral direction, where it is laterally moved beyond the die opening on either side. Consideration is also given to the possibility of performing several such back-and-forth transversal movements during a filling operation, and also the possibility of overlapping this transversal movement with a reciprocating movement of the fill shoe from its rest position to the position above the die opening. The aim is to distribute the powder in the die opening as evenly as possible.

SUMMARY

It is the object of the present invention to improve a ceramic and/or metal powder press in such a manner that the loss of time is reduced and, in particular, the cycle duration for compressing a compact is shortened.

The object is achieved by a press having the features of claim 1, by a method having the features of claim 6, and the data carrier comprising a program according to claim 11. Advantageous embodiments are the subject matter of the dependent claims.

Accordingly, a ceramic and/or metal powder press is preferred, comprising a die having a die surface and a die opening for filling in and compressing a metallic and/or ceramic powder and/or granular material, a fill shoe arranged to be moveable along a travel path across the die surface for filling in the material, and feed tubes connected with the fill shoe for filling the material into or via the fill shoe, wherein at least two such feed tubes are connected with the fill shoe from a direction lateral to the travel path.

Moving the fill shoe across the die opening involves, in particular, moving the fill shoe filled with a sufficient amount of material in its interior, as the case may be, across the die surface in such a manner that the material inside cannot pass to the outside between the fill shoe and the die surface. The feed tubes can be formed to extend to a point directly above the die opening if the material to be compressed is only conveyed through the feed tubes when the traversal reaches the position above the die opening. However, the feed tubes can also extend to a point relatively far removed from the die opening into an interior of the fill shoe. Various other embodiments are also possible, in particular those which are known as such. The feed tubes can be in the form of flexible hoses, in particular, in order to keep the movement of the fill shoe across the die opening as free of interference as possible. Connecting the feed tubes to the fill shoe can be achieved in various ways, in particular those which are known as such, such as by coupling to the fill shoe, and also by means of a fixed connection to the body of the fill shoe.

The preferred embodiment makes it possible, in particular, to shorten the necessary travel of the top punch assembly and the top cylinder arrangement of press drives relative to the die surface.

Connecting the feed tubes to the fill shoe from a direction lateral to the travel path means, in particular, that the feed tubes extend and are arranged relative to the fill shoe in a direction transverse to the travel path, i.e. not from the front or the back in parallel to the travel path. However, feed tubes extending in an oblique direction to the travel path could also be meant if, in particular, sufficiently uniform filling of the fill shoe interior and/or the die opening is enabled.

This makes it possible, in particular, for headroom requirements above the travel path to be reduced by arranging two or more such feed tubes laterally with respect to the travel path, above which the top press components are arranged, while the fill shoe is above the die opening. By keeping the punch assemblies and further components at a shorter distance above the die opening, the cycle duration can be shortened.

The compacts are, in particular, engineering compacts of engineering ceramics or metal, such as gears.

A press is preferred in which the feed tubes, in particular all such feed tubes, are connected to the fill shoe laterally to the travel path between reversal points reached during compressing or between a filling-in operation and a reversal point reached during compressing. In other words, the term "laterally to the travel path" for such an embodiment is defined in dependence on whether the travel path extends between the reversal points reached on two diametrically opposed sides of the die opening or between a filling position and a reversal point reached during compressing.

In particular, the fill shoe can be free of connected feed tubes at its circumferential sides transverse to the travel path. In particular, the feed tubes can be arranged on a side wall extending parallel to the travel path. However, such feed tubes can also be connected to side walls of the fill shoe extending at an angle thereto. This applies, in particular, to the side wall extending at an angle of 45° or less with respect to the travel path.

It is preferred, in particular, for the feed tubes to be connected to a side wall of the fill shoe at a distance to a central line of movement along the travel path, wherein the distance is greater than a lateral extension of the die opening transverse to the central line of movement.

The central line of movement, in the present context, is in particular a linear travel path if the fill shoe is only moved linearly. However, movements transverse to the central line of movement can also be meant if, in particular, the fill shoe performs lateral movements above the die opening to achieve more uniform powder distribution. The distance of the coupling location of the feed tubes at the side wall of the fill shoe to the central line of movement is, in particular, a distance of an inner side wall of a fill shoe interior to the central line of movement, in particular to a center point of the die opening. Depending on the definition of the term, points on the external side wall of the fill shoe could also be meant at which the feed tube opens out into the corresponding side wall.

A direction transverse to the central line of movement is supposed to be a direction transverse to the longitudinal extension of the travel path of the fill shoe between its two reversal points. This also comprises, in particular, continuous and mutually overlapping longitudinal and transverse movements.

A press is preferred, in which at least one of the feed tubes is connected to the fill shoe laterally on the right of the travel path and at least one of the feed tubes is connected to the fill shoe laterally on the left of the travel path. Arranging the feed tubes as uniformly as possible laterally on the right and laterally on the left of the travel path causes the movement of the fill shoe to the right and left of its main direction of movement to be uniformly affected while the fill shoe is moved with the feed tubes attached thereto.

A method for compressing a compact of a metallic and/or ceramic powder and/or granular material is independently preferred, comprising filling in such a material via a fill shoe into a die opening of a die, and after moving the fill shoe away, compressing the material in the die opening by means of punch assemblies, wherein the method is carried out in such a ceramic and/or metal powder press.

The method is thus carried out on a press in which the fill shoe has the feed tubes or feed hoses attached at its lateral side walls laterally to the travel path of the fill shoe. It is thus possible for the top press components, in particular press punches, to be raised to a relatively low height above the die surface, or the die opening, thus achieving a shorter cycle duration overall.

A method is also preferred, independently from the above-mentioned method, wherein, in a ceramic and/or metal powder press, during a compressing cycle, the fill shoe is traversed from a first rest and/or reversal position, along the travel path, beyond the die opening, to a second rest and/or reversal position and is traversed back, in the opposite direction, to the first rest and/or reversal position, only in a subsequent compressing cycle. In other words, the fill shoe crosses the die opening in the forward direction in the first compressing cycle and, only after compressing the material—in particular after pre-compressing or final compressing or calibrating and coining—crosses it in the backward direction, in a second compression cycle, which involves renewed filling of the die opening with material to be compressed.

Such traversal of the fill shoe across the die surface according to the method has many advantages. By performing a linear movement to a point beyond the die opening, no braking or decelerating is necessary during the compression cycle, whereby the fill shoe is braked until it reaches a rest position or reversal position, and then has to be accelerated back to its first rest and reversal position. In particular, empty traversal is eliminated, by which the fill shoe is traversed, as the case may be, to a point beyond the die opening to its second reversal position, before it is moved back in the opposite direction to its first rest and reversal position during the same compression cycle. By moving the fill shoe across the die opening in a smooth motion in one direction until it reaches the second reversal position without moving back during the same compression cycle, uniform powder distribution is nevertheless possible. In particular, when compared to complete extension of the fill shoe beyond the die opening and then its movement back within the same compression cycle, limiting the movement of the fill shoe to only the second reversal position during one-and-the-same compression cycle, results in the overall traversing distance of the fill shoe being shortened, thus also shortening the duration of the cycle, since the fill shoe crosses the die opening in one direction, but is not moved all the way back.

In such a method it is preferred for the fill shoe to be moved essentially linearly along the travel path between its reversal positions. While linear movement is preferred along its travel path, lateral shaking movements above the die opening, or meandering movement paths are also possible, so that, as the case may be, the movement may be said to be only essentially a linear movement.

Such methods can be implemented, in particular, in which the fill shoe is continuously moved during the movement across the die opening, in particular during the entire movement between its reversal positions. In the present case, a continuous movement means, in particular, that the velocity of the fill shoe is uniform in the area of the die opening, in order to achieve uniform distribution of the powder. Other embodiments are also possible, however, in which the velocity of the fill shoe is modified, where the continuous movement is to be interpreted as the fill shoe moving without interruption between its reversal positions.

A method is particularly preferred, in which during the conduction of the material through the feed tubes, the material is simultaneously conveyed on the right and left through the same number of feed tubes into the fill shoe and/or the die opening. If the material is fed through only one of the feed tubes, it can undesirably affect the fill shoe and/or its movement across the die surface. In particular, by uniformly feeding material to be compressed on both sides of the fill shoe, the fill shoe, or its movement, will be uniformly influenced, so that there is no lopsided or excessively one-sided effect on the fill shoe or its movement.

A data carrier is independently preferred, having a program stored thereon, which is programmed for carrying out such a method and/or is programmed in a control device of such a press.

Such a control device can be a control device which is usually used for moving the fill shoe within a press, which is designed for carrying out a sequence of movements of various press components in response to such a control program. The control device can be formed purely as a control device, such as a processor; however, it can also comprise a combination of so-called hardware- and software-controllable components.

BRIEF DESCRIPTION OF THE DRAWINGS

An exemplary embodiment will be described in the following with reference to the accompanying drawings, in which.

DETAILED DESCRIPTION

Figure 1:
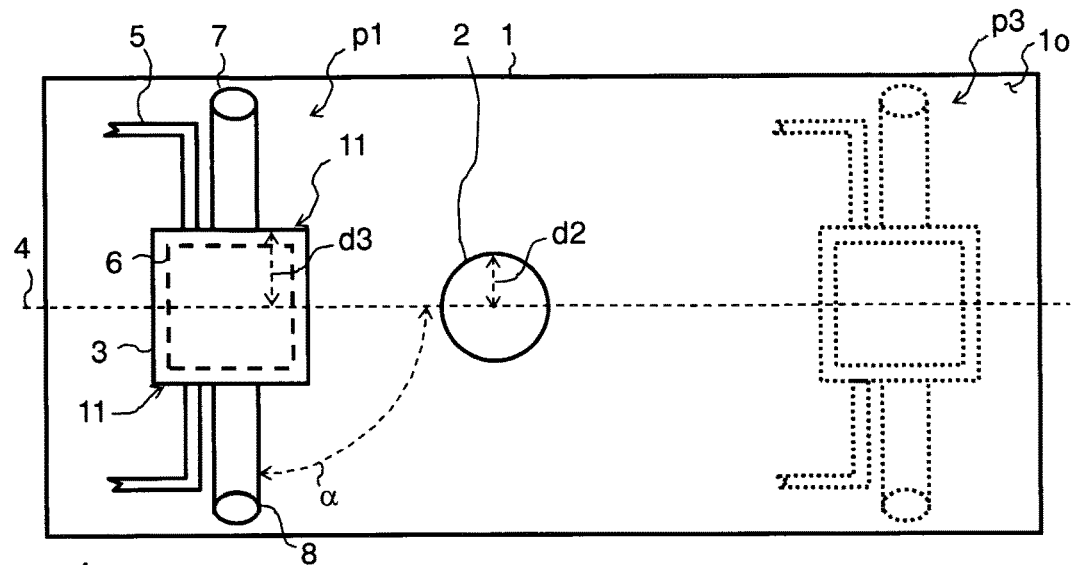
FIG. 1 is a plan view of a die of an exemplary ceramic and/or metal powder press having a fill shoe installed and further components arranged thereon.
Figure 2:
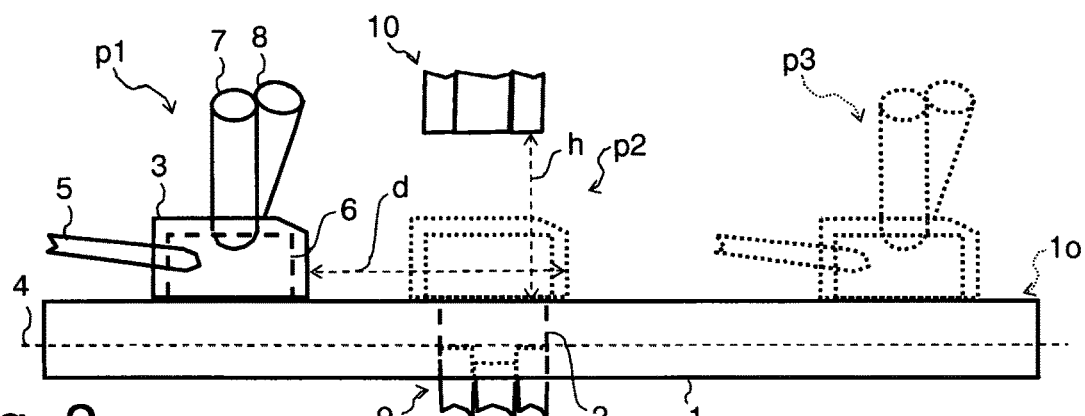
FIG. 2 shows an arrangement according to FIG. 1 in a side elevational view.
Figure 3:
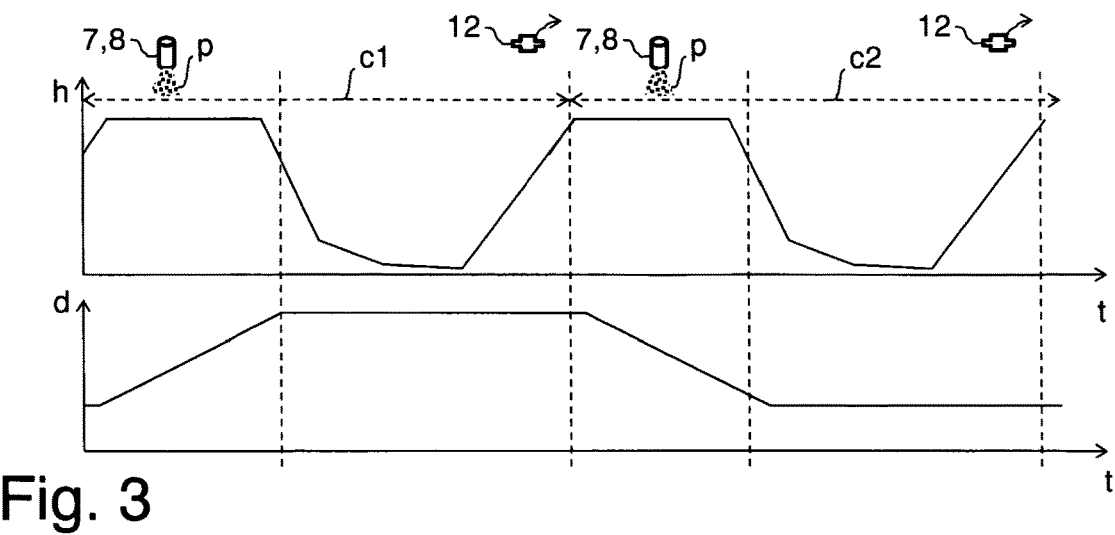
FIG. 3 shows two block diagrams one on top of the other to illustrate the height adjustment of overhead punch assemblies and/or press drive components, or movement of the fill shoe beyond the die surface of a die.

FIGS. 1 and 2 schematically show components of a press for compressing a compact illustrated in FIG. 3. The compact is produced by compressing at least one metallic and/or ceramic powder and/or granular material p.

In the press, a die 1 is arranged which has a die opening 2. The die opening 2 is for filling in the powder and/or granular material p, in particular ceramic powder and/or metal powder, by means of a feeding device. The material or powder in question can also be a granular material or a mixture of fine-grain powder and granular material.

The feeding device comprises a fill shoe 3, which is placed on the die surface 1o of the die 1. The fill shoe 3 is moveable or traversable along a travel path 4 across the die surface 1o. A linear movement is preferred, extending from a first rest and/or reversal position p1, where the component is shown with two solid lines, to a second rest and/or reversal position p3, where the component is shown with dotted lines. The second rest and/or reversal position p3 is located beyond the die opening 2. The rest and/or reversal positions in the present context are a rest and reversal position or a pure reversal position.

Both rest and/or reversal positions p1, p3 are at a sufficient distance from the die opening 2 to enable compressing a compact in the die opening 2, while the fill shoe 3 and components coupled or attached to it are at least in the rest and/or reversal positions p1, p3.

In addition to a linear movement of the fill shoe 3 along the travel path 4, movements transverse to the travel path 4 are basically also possible, or overlapping longitudinal and transverse movements of the fill shoe 3 are possible during its traversal between its rest and/or reversal positions p1, p3.

For moving the fill shoe 3 and any components arranged or attached thereon, a guiding device 5 is provided which comprises rod components attached or coupled to the fill shoe 3, which connect to a drive. The drive and the rod components enable the movement of the fill shoe 3 across the die surface.

The feeding device also comprises at least two feed tubes 7, 8 for conveying powder or granular material or a mixture thereof from a powder reservoir into or via the fill shoe 3 or directly into the die opening 2. As viewed in the direction of the travel path 4, the first one of the feed tubes 7 is arranged on the left side of the fill shoe while the second one of the feed tubes 8 is arranged on the right side of the fill shoe 3.

The feed tubes 7, 8 are preferably formed as feed hoses of a flexible material to enable movement of the feeding device 5 together with the fill shoe 3. The feed tubes 7, 8 can be fixedly attached to the body of the fill shoe 3 in any suitable manner, in particular in a manner known as such, or can be only coupled to the fill shoe 3.

In relation to the lateral dimension or extension d2 of the die opening 2 transverse to the central line of movement, a point of attachment or coupling of the fill tubes 7, 8 is arranged on the fill shoe 3 at a distance sufficiently to the side of the travel path 4 or a central line of movement along the travel path 4, that the distance d3 from the central line of movement is larger than the lateral dimension d2 of the die opening 2 transverse to the central line of movement. The distance d3 is a distance, in particular, to a side wall 11 of the fill shoe 3 which extends on a side of the travel path 4. In particular, the side wall 11 is not a front or back wall or a corresponding section of the fill shoe as viewed in the direction of movement of the fill shoe 3. The side wall can be regarded as an outside point of the side wall 11 or as an inside point of the side wall 11. In particular, if the feed tube 7, 8 extends through the side wall 11 and protrudes a certain length into an interior 6 of the fill shoe 3, the side wall can also be a point at which the feed tube 7, 8 opens out into the fill shoe interior 6.

FIG. 1 shows that the feed tubes 7, 8 are attached or coupled to the fill shoe 3 at an angle α of about 90° with respect to the travel path 4. As illustrated in FIG. 2, such coupling can optionally also be at a different angle α, in particular at an angle larger than 45°, up to 90°. Moreover, it is also covered that a lateral side wall 11 of the fill shoe 3 extends at an angle other than parallel to the travel path 4, but can also extend at an oblique angle to the travel path 4, to which said feed tube 7, 8 is attached or coupled. Crucially, the feed tubes 7, 8 extend in a lateral direction from the fill shoe 3 as viewed from the travel path 4. This enables as much room as possible above the fill shoe 3 to be kept free, so that the overhead punch assemblies only need to be lifted upwards, away from the die surface 1o, or the die opening 2, as little as possible.

One or more bottom punches of a bottom punch assembly 9 extend into the die opening and close off the die opening 2 at the bottom. The exemplary bottom punches shown are adjustable with respect to each other and relative to the die by means of drive devices, in particular. After filling in the powder and/or granular material p, it can be compacted and compressed to a compact 12 by means of one or more punches of a top punch assembly 10. For this purpose, the top punches are introduced into the die opening 2 from above, wherein the exemplary plurality of top punches are adjustable with respect to each other and relative to the die 1 by means of drive devices.

According to the present method, as shown in FIG. 2 and, in particular, as shown in FIG. 3, the fill shoe 3, together with the components attached thereto, in particular with the feed tubes 7, 8 arranged laterally thereon, is moved during a first compressing cycle from its first reversal position or rest and reversal position p1, at a first time point, toward the die opening. Before it reaches an intermediate position p2 for filling the die opening with material p, the fill shoe 3 covers a first traversing distance d. During this movement of the fill shoe 3, the top punch assembly 10 together with the components for adjusting it, is positioned at a height h sufficiently high above the die opening 2 to leave enough space for the fill shoe 3, together with the components attached and coupled thereto, to be moved across the die opening 2. As can be seen from the flow diagrams with the illustration of height h, or the traversing distance d of the fill shoe 3 as a function of time t, the movements of the top punch assembly 10 and the fill shoe 3 can partially overlap each other.

If the fill shoe were only to reach the illustrated intermediate position p2, or even if it moved slightly beyond this point and immediately returned to its first rest and/or reversal position p1, according to an independently implementable embodiment, a time saving, or a shortening of the first cycle duration c1 is achievable, since due to the lateral arrangement of the feed tubes 7, 8 the top punch assembly 10 only needs to be lifted to a lower height h.

However, a method embodiment is particularly preferred wherein the fill shoe 3, together with the components arranged thereon, is moved further to the spaced second rest and/or reversal position p3 after or during filling of the die opening 2, which also enables compressing of the compact 12. Compressing is carried out without reversing the fill shoe 3 and without moving the fill shoe 3 to its original first rest and/or reversal position p1. This can be seen from FIG. 3, in particular, where the fill shoe 3 is only moved back into the first rest and/or reversal position p1 during a second compression cycle c2. During this backward movement during the second compression cycle c2, the die opening 2 is filled with material p again and another compact 12 is compressed.

In other words, a cycle combination of two individual compression cycles c1, c2 allows the die opening to be filled, the compact 12 to be compressed and the compact 12 to be removed during the first compression cycle c1, and another compact 12 to be compressed and removed during the second compression cycle c2.

Basically, other embodiments are also possible, for example in the case of compressing a compact 12 of different types of material, wherein the die is filled with a first material during the first compression cycle c1 and pre-compressing is carried out by moving the punch assemblies 9, 10, before, during the second compression cycle c2, a second material is filled in, which is subsequently compressed together with the pre-compressed first material to produce the compact 12. Of course, it is possible to fill in further materials, each with its own subsequent pre-compression step, before final compression is carried out to produce the compact 12.

LIST OF REFERENCE NUMERALS

1 die
1o die surface
2 die opening
3 fill shoe
4 travel path
5 guiding device
6 fill shoe interior
7 feed tube
8 feed tube
9 bottom punch assembly
10 top punch assembly
11 side wall
12 compact
d first traversing distance of fill shoe
d2 lateral extension of the die opening transverse to the central line of movement
d3 lateral distance from a central line of movement
h height of the top punch assembly
p metal and/or ceramic powder and/or granular material
p1 first rest or reversal position
p2 intermediate position for filling
p3 rest or reversal position
t time
α angle of feed tubes to travel path

What is claimed is:

1. A ceramic and/or metal powder press, comprising:
a die having a die surface and a die opening for filling in and compressing a metallic and/or ceramic powder and/or granular material;
a fill shoe arranged to be moveable along a travel path across the die surface for filling in the material; and
at least two feed tubes attached to and directly connected with the fill shoe for filling the material into or via the fill shoe,
wherein a first feed tube of the at least two feed tubes is attached to and directly connected to a first lateral side of the fill shoe such that the material enters an interior of the fill shoe from the first feed tube from a first direction lateral to the travel path,
wherein a second feed tube of the at least two feed tubes is attached to and directly connected to a second lateral side of the fill shoe such that the material enters the interior of the fill shoe from the second feed tube in a second direction lateral to the travel path, and
wherein the second lateral side is positioned opposite the first lateral side relative to the travel path.

2. The press according to claim 1, wherein the at least two feed tubes are connected to the fill shoe laterally to the travel path between reversal points reached during compressing or between a filling-in operation and a reversal point reached during compressing.

3. The press according to claim 1, wherein the fill shoe is free of connected feed tubes at its circumferential sides transverse to the travel path.

4. The press according to claim 1, wherein the at least two feed tubes are connected at a side wall of the fill shoe at a distance to a central line of movement along the travel path, wherein the distance is greater than a lateral extension of the die opening transverse to the central line of movement.

5. The press according to claim 1, wherein the feed tubes extend and are directly connected to the fill shoe in a direction transverse to the travel path.

6. The press according to claim 1, wherein the feed tubes extend and are directly connected to the fill shoe in a direction oblique to the travel path.

7. The press according to claim 1, wherein the feed tubes extend and are arranged not from the front or the back in parallel to the travel path.

8. The press according to claim 1, wherein the travel path extends between reversal points reached on two diametrically opposed sides of the die opening or between a filling position and a reversal point reached during compressing.

9. A method for compressing a compact of a metallic and/or ceramic powder and/or granular material in a ceramic and/or metal powder press comprising a die having a die surface and a die opening for filling in and compressing a metallic and/or ceramic powder and/or granular material; a fill shoe arranged to be moveable along a travel path across the die surface for filling in the material; and at least two feed tubes attached to and directly connected with the fill shoe for filling the material into or via the fill shoe, wherein a first feed tube of the at least two feed tubes is attached to and directly connected to a first lateral side of the fill shoe such that the material enters an interior of the fill shoe from the first feed tube from a first direction lateral to the travel path, wherein a second feed tube of the at least two feed tubes is attached to and directly connected to a second lateral side of the fill shoe such that the material enters the interior of the fill shoe from the second feed tube in a second direction lateral to the travel path, and wherein the second lateral side is positioned opposite the first lateral side relative to the travel path, the method comprising:

filling in such a material through the fill shoe into the die opening of the die; and after moving the fill shoe away, compressing the material in the die opening by means of punch assemblies.

10. The method according to claim 9, wherein during a compressing cycle the fill shoe is traversed from a first rest and/or reversal position, along the travel path, beyond the die opening, to a second rest and/or reversal position and is traversed back, in the opposite direction, to the first rest and/or reversal position, only in a subsequent compressing cycle.

11. The method according to claim 9, wherein the fill shoe is moved essentially linearly along the travel path between its rest and reversal positions or reversal position.

12. The method according to claim 9, wherein the fill shoe is continuously moved during the movement across the die opening, in particular during the entire movement between its rest and reversal positions, or reversal positions.

13. The method according to claim 9, wherein during the conduction of the material through the at least two feed tubes, the material is simultaneously conveyed through the at least two feed tubes.

14. The press according to claim 1, further comprising a control device comprising a program stored thereon for moving the fill shoe within the press.

* * * * *